United States Patent
Hosseini et al.

(10) Patent No.: US 11,716,726 B2
(45) Date of Patent: Aug. 1, 2023

(54) MESSAGE HANDLING FOR DEVICE-TO-DEVICE COORDINATION MESSAGES

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/444,428

(22) Filed: Aug. 4, 2021

(65) Prior Publication Data

US 2022/0046627 A1 Feb. 10, 2022

Related U.S. Application Data

(60) Provisional application No. 62/706,302, filed on Aug. 7, 2020.

(51) Int. Cl.
*H04W 72/12* (2023.01)
*H04W 72/20* (2023.01)
*H04W 72/1263* (2023.01)
*H04W 72/566* (2023.01)

(52) U.S. Cl.
CPC ....... *H04W 72/20* (2023.01); *H04W 72/1263* (2013.01); *H04W 72/569* (2023.01)

(58) Field of Classification Search
None
See application file for complete search history.

(56) References Cited

U.S. PATENT DOCUMENTS

| | | | |
|---|---|---|---|
| 2018/0234911 A1* | 8/2018 | Zhao | H04W 72/04 |
| 2019/0132893 A1* | 5/2019 | Lu | H04L 41/0806 |
| 2020/0178043 A1* | 6/2020 | Cavalcanti | H04W 4/08 |
| 2022/0338211 A1* | 10/2022 | Alabbasi | H04W 72/569 |

FOREIGN PATENT DOCUMENTS

WO WO-2022010410 A1 * 1/2022

* cited by examiner

*Primary Examiner* — Kodzovi Acolatse
(74) *Attorney, Agent, or Firm* — Qualcomm Incorporated

(57) ABSTRACT

Various aspects of the present disclosure generally relate to wireless communication. In some aspects, a user equipment (UE) may drop a first one or more device-to-device coordination messages for transmission, of a set of device-to-device coordination messages, according to a message dropping criterion in connection with a quantity of device-to-device coordination messages in the set of device-to-device coordination messages exceeding a threshold. The UE may transmit a second one or more device-to-device coordination messages of the set of device-to-device coordination messages, such that a quantity of transmitted device-to-device coordination messages, of the set of device-to-device coordination messages, does not exceed the threshold. Numerous other aspects are described.

30 Claims, 13 Drawing Sheets

MESSAGE HANDLING FOR DEVICE-TO-DEVICE COORDINATION MESSAGES

CROSS-REFERENCE TO RELATED APPLICATION

This Patent Application claims priority to U.S. Provisional Patent Application No. 62/706,302, filed on Aug. 7, 2020, entitled "MESSAGE HANDLING FOR DEVICE-TO-DEVICE COORDINATION MESSAGES," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for message handling in device-to-device communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to drop a first one or more device-to-device coordination messages, of a set of device-to-device coordination messages for transmission, according to a message dropping criterion in connection with a quantity of device-to-device coordination messages in the set of device-to-device coordination messages exceeding a threshold. The one or more processors may be configured to transmit a second one or more device-to-device coordination messages of the set of device-to-device coordination messages, such that a quantity of transmitted device-to-device coordination messages, of the set of device-to-device coordination messages, does not exceed the threshold.

Some aspects described herein relate to a non-transitory computer-readable medium that stores a set of instructions for wireless communication by a UE. The set of instructions, when executed by one or more processors of the UE, may cause the UE to drop a first one or more device-to-device coordination messages, of a set of device-to-device coordination messages for transmission, according to a message dropping criterion in connection with a quantity of device-to-device coordination messages in the set of device-to-device coordination messages exceeding a threshold. The set of instructions, when executed by one or more processors of the UE, may cause the UE to transmit a second one or more device-to-device coordination messages of the set of device-to-device coordination messages, such that a quantity of transmitted device-to-device coordination messages, of the set of device-to-device coordination messages, does not exceed the threshold.

Some aspects described herein relate to an apparatus for wireless communication. The apparatus may include means for dropping a first one or more device-to-device coordination messages, of a set of device-to-device coordination messages for transmission, according to a message dropping criterion in connection with a quantity of device-to-device coordination messages in the set of device-to-device coordination messages exceeding a threshold. The apparatus may include means for transmitting a second one or more device-to-device coordination messages of the set of device-to-device coordination messages, such that a quantity of transmitted device-to-device coordination messages, of the set of device-to-device coordination messages, does not exceed the threshold.

Some aspects described herein relate to a method of wireless communication performed by a UE. The method may include dropping a first one or more device-to-device coordination messages for transmission, of a set of device-to-device coordination messages, according to a message dropping criterion in connection with a quantity of device-to-device coordination messages in the set of device-to-device coordination messages exceeding a threshold. The method may include transmitting a second one or more device-to-device coordination messages of the set of device-to-device coordination messages, such that a quantity of transmitted device-to-device coordination messages, of the set of device-to-device coordination messages, does not exceed the threshold.

In some aspects, a method of wireless communication performed by a UE includes determining that a quantity of device-to-device coordination messages for transmission exceeds a threshold. The method may include dropping one or more device-to-device coordination messages according to a message dropping criterion based at least in part on determining that the quantity of device-to-device coordination messages exceeds the threshold.

In some aspects, a UE for wireless communication includes a memory and one or more processors coupled to the memory, the one or more processors configured to determine that a quantity of device-to-device coordination messages for transmission exceeds a threshold. The one or more processors may be configured to drop one or more device-to-device coordination messages according to a message dropping criterion based at least in part on determining that the quantity of device-to-device coordination messages exceeds the threshold.

In some aspects, a non-transitory computer-readable medium storing a set of instructions for wireless communication includes one or more instructions that, when executed by one or more processors of a UE, cause the UE to determine that a quantity of device-to-device coordination messages for transmission exceeds a threshold and drop one or more device-to-device coordination messages according to a message dropping criterion based at least in part on determining that the quantity of device-to-device coordination messages exceeds the threshold.

In some aspects, an apparatus for wireless communication includes means for determining that a quantity of device-to-device coordination messages for transmission exceeds a threshold. The apparatus includes means for dropping one or more device-to-device coordination messages according to a message dropping criterion based at least in part on determining that the quantity of device-to-device coordination messages exceeds the threshold.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
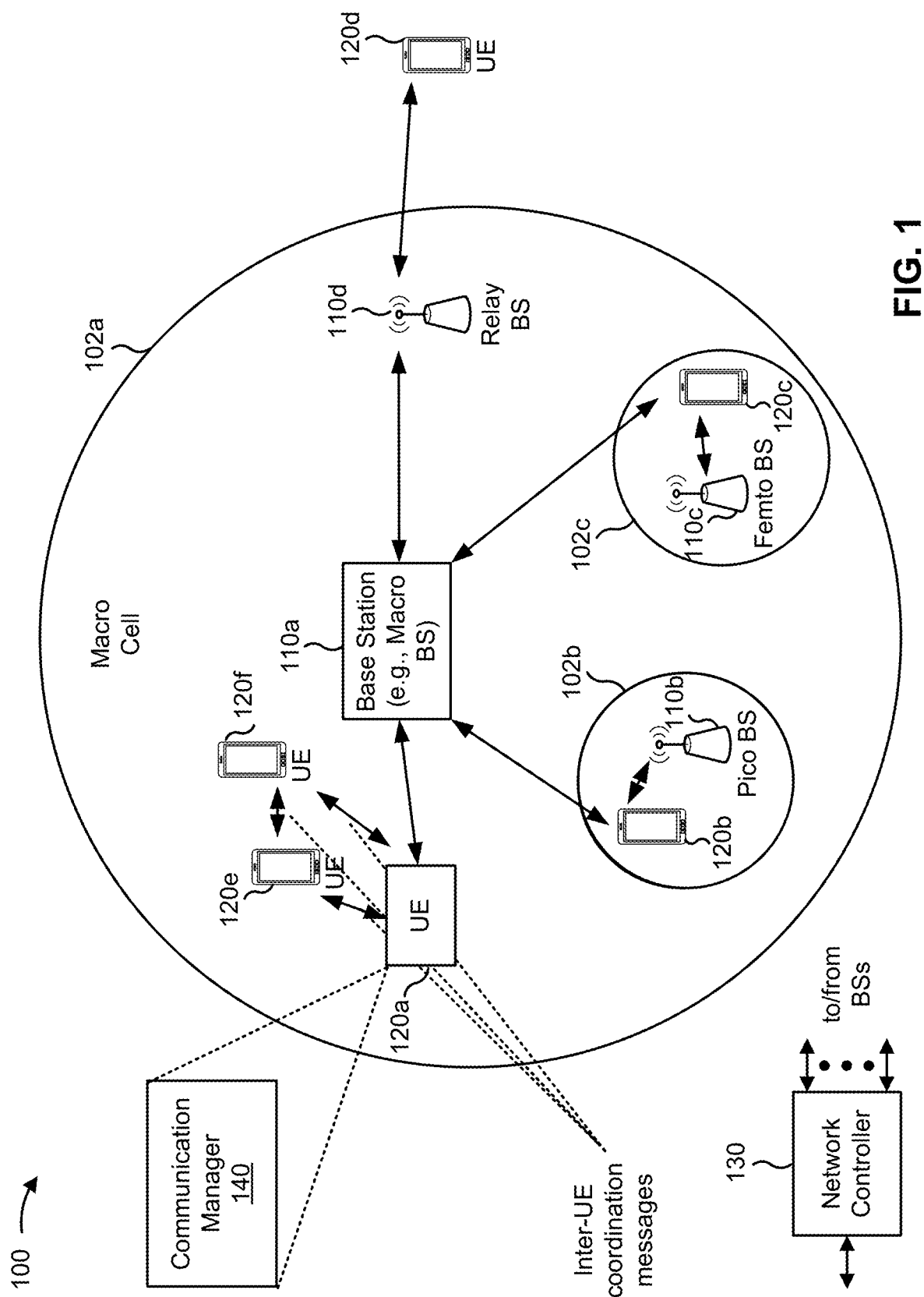
FIG. 1 is a diagram illustrating an example of a wireless network, in accordance with the present disclosure.

A user equipment (UE) engaged in device-to-device communication, such as sidelink communication, may be configured with resources that are to be used to transmit device-to-device coordination messages, such as sidelink inter-UE coordination information messages. For example, a first UE may receive, from a second UE and a third UE, a request for a sidelink inter-UE coordination message. The first UE may perform resource sensing to determine whether resources are available and may transmit the sidelink inter-UE coordination message to the second UE and the third UE to identify reserved resources and available resources in a selection window. This may enable the second UE and the third UE, respectively, to select resources for transmission. Additionally, or alternatively, the first UE may provide the sidelink inter-UE coordination message to the second UE to enable the second UE to select transmission resources for the third UE (and the second UE may indicate the selected transmission resources to the third UE). However, in some scenarios, the first UE may have a plurality of sidelink inter-UE coordination messages requested for transmission using the same resources. In some other scenarios, the first UE may have more sidelink inter-UE coordination messages requested for concurrent transmission than the first UE has a capability of concurrently transmitting.

Some aspects described herein enable message handling for device-to-device coordination messages, such as sidelink inter-UE coordination messages. For example, the first UE may prioritize a plurality of sidelink inter-UE coordination messages that are requested for transmission. Based at least in part on the prioritization, the first UE may drop or delay one or more of the plurality of sidelink inter-UE coordination messages. In this way, the first UE handles conflicting or excess requests for sidelink inter-UE coordination messages.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may drop a first one or more device-to-device coordination messages, of a set of device-to-device coordination messages for transmission, according to a message dropping criterion in connection with a quantity of device-to-device coordination messages in the set of device-to-device coordination messages exceeding a threshold; and transmit a second one or more device-to-device coordination messages of the set of device-to-device coordination messages, such that a quantity of transmitted device-to-device coordination messages, of the set of device-to-device coordination messages, does not exceed the threshold. Additionally, or alternatively, the communication manager 140 may perform one or more other operations described herein.

As indicated above, FIG. 1 is provided as an example. Other examples may differ from what is described with regard to FIG. 1.

Figure 2:
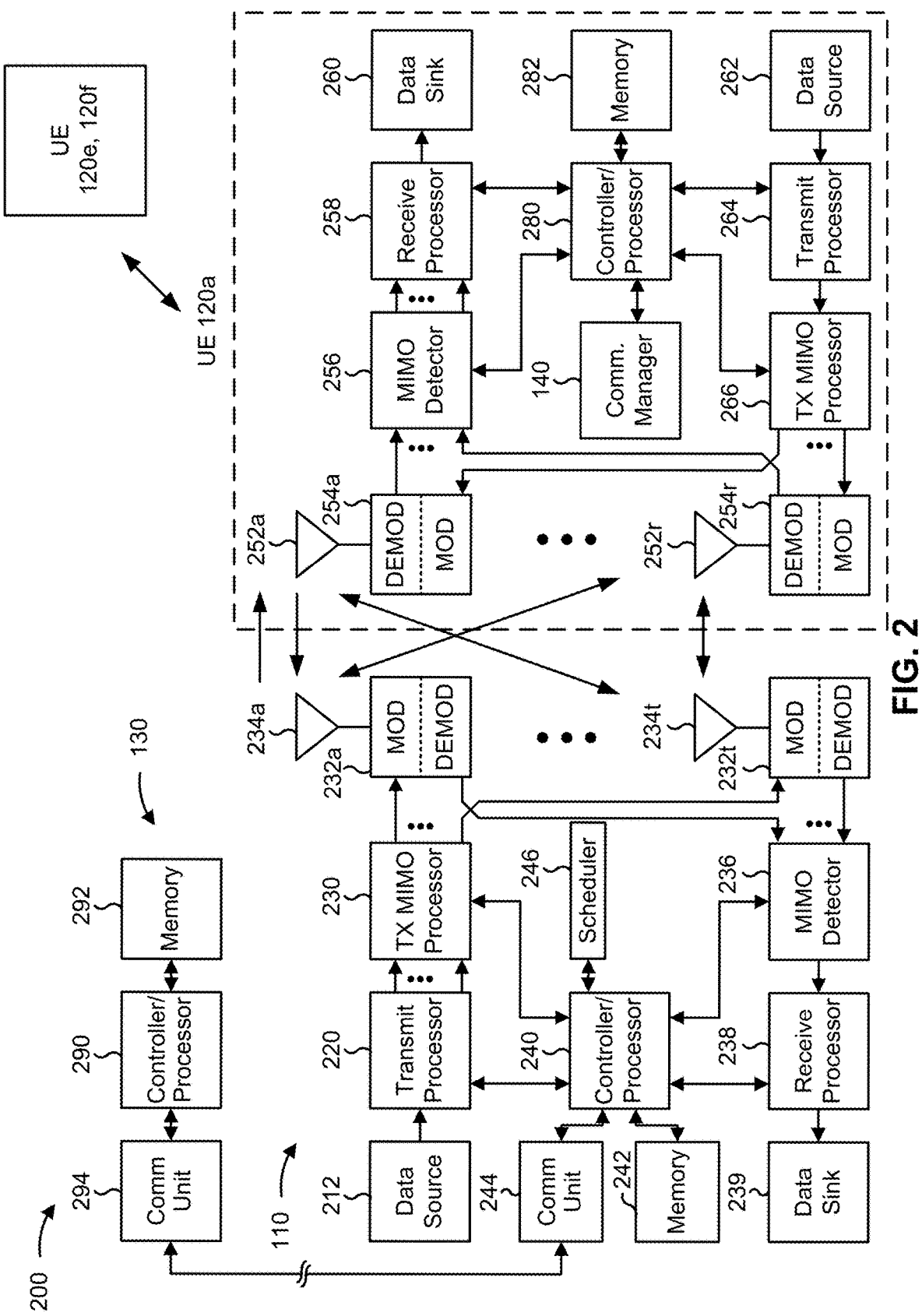
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with message handling for device-to-device coordination messages, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9 and/or other processes as described herein. In some examples, executing instructions may include running the instructions, converting the instructions, compiling the instructions, and/or interpreting the instructions, among other examples.

In some aspects, the UE includes means for dropping a first one or more device-to-device coordination messages, of a set of device-to-device coordination messages, according to a message dropping criterion in connection with a total quantity of device-to-device coordination messages in the set of device-to-device coordination messages exceeding a threshold; and/or means for transmitting a second one or more device-to-device coordination messages of the set of device-to-device coordination messages, such that a sub-quantity of transmitted device-to-device coordination messages does not exceed the threshold. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
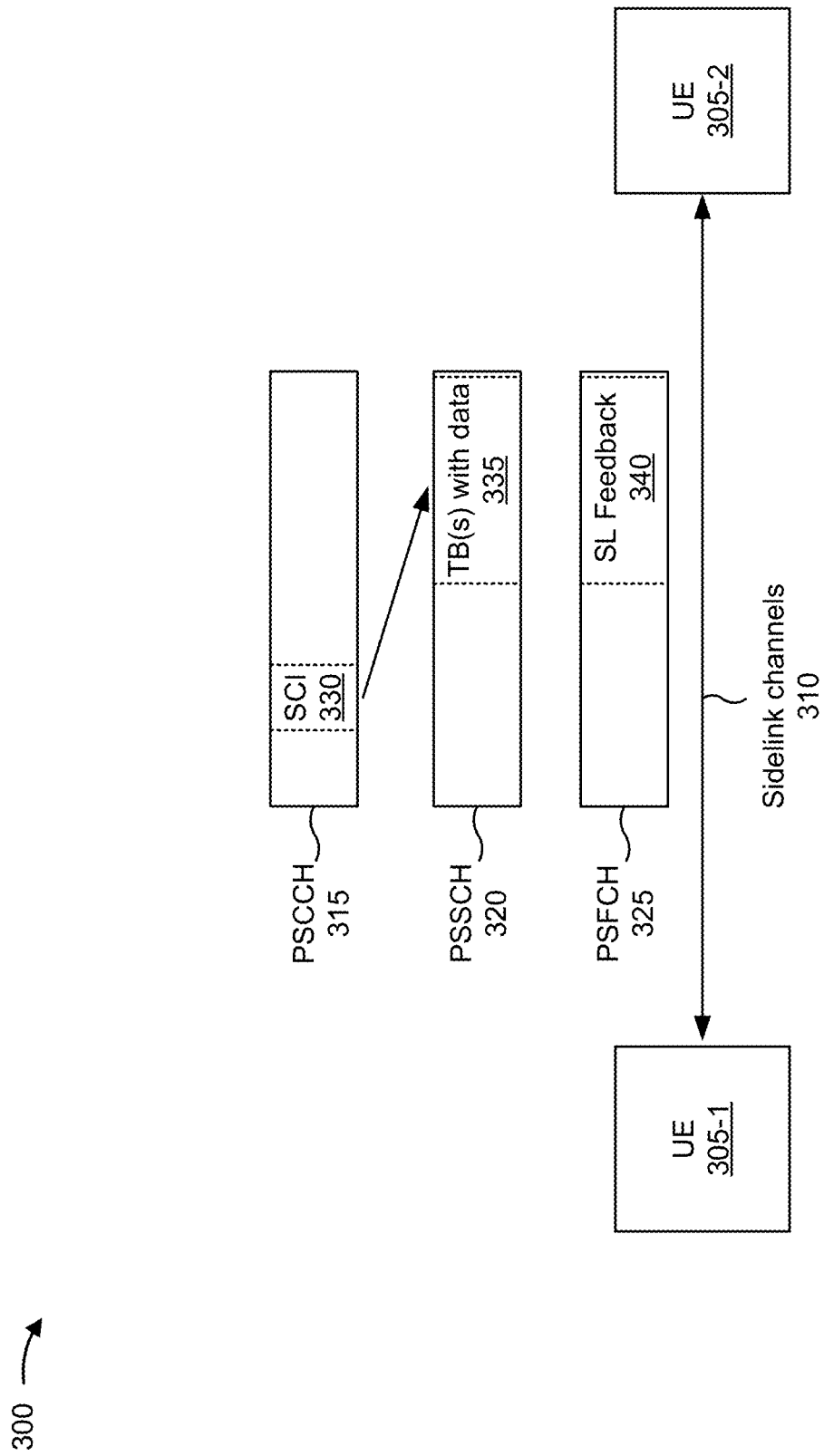
FIG. 3 is a diagram illustrating an example of device-to-device communications, in accordance with the present disclosure.

FIG. 3 is a diagram illustrating an example 300 of device-to-device communications, in accordance with the present disclosure.

As shown in FIG. 3, a first UE 305-1, which may correspond to UE 120a, may communicate with a second UE 305-2, which may correspond to UE 120e, (and one or more other UEs 305) via one or more sidelink channels 310, which may be an example of device-to-device communications. The UEs 305-1 and 305-2 may communicate using the one or more sidelink channels 310 for P2P communications, D2D communications, V2X communications (e.g., which may include V2V communications, V2I communications, V2P communications, a combination thereof, and/or the like), mesh networking, a combination thereof, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, a combination thereof, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, a combination thereof, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), a combination thereof, and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, a combination thereof, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, a combination thereof, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, a combination thereof, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
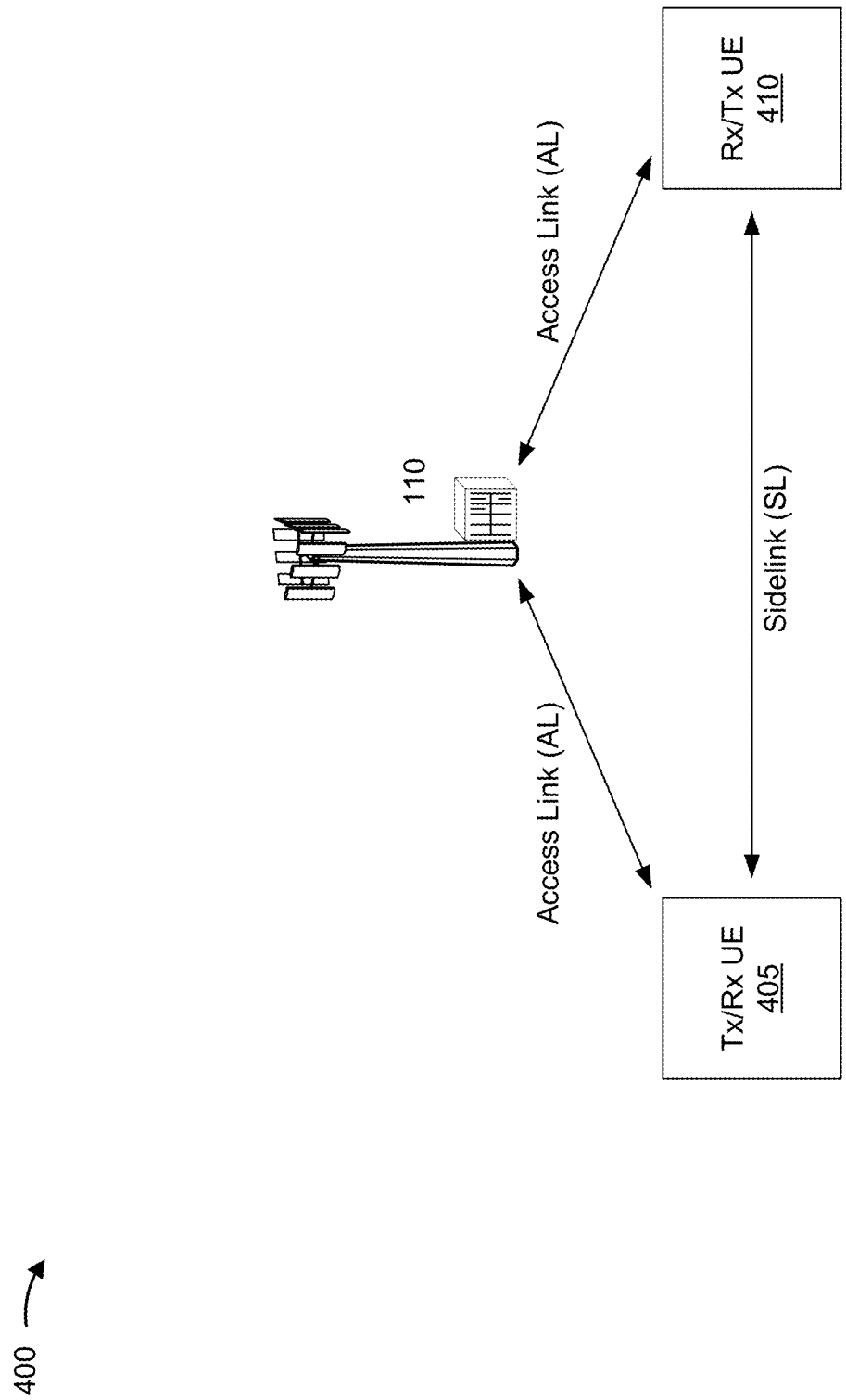
FIG. 4 is a diagram illustrating an example of device-to-device communications and access link communications, in accordance with the present disclosure.

FIG. 4 is a diagram illustrating an example 400 of device-to-device communications and access link communications, in accordance with various aspects of the present disclosure.

As shown in FIG. 4, a transmitter (Tx)/receiver (Rx) UE 405, which may correspond to UE 120*a*, and an Rx/Tx UE 410, which may correspond to UE 120*e*, may communicate with one another via a sidelink, which may be an example of a device-to-device link, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5A:
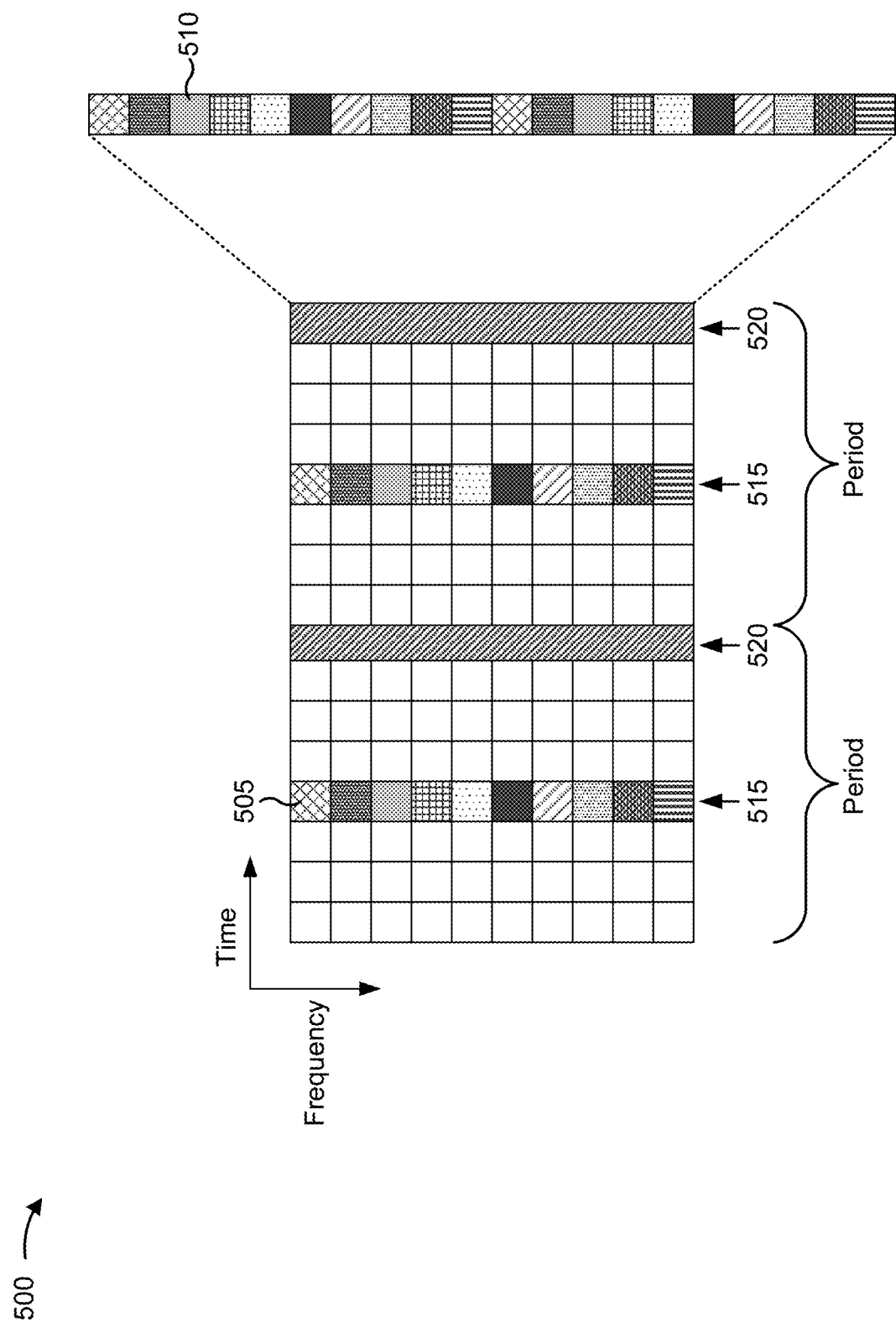
FIGS. 5A and 5B are diagrams illustrating examples of requesting and reporting resources for sidelink inter-UE coordination information, in accordance with the present disclosure.
Figure 5B:
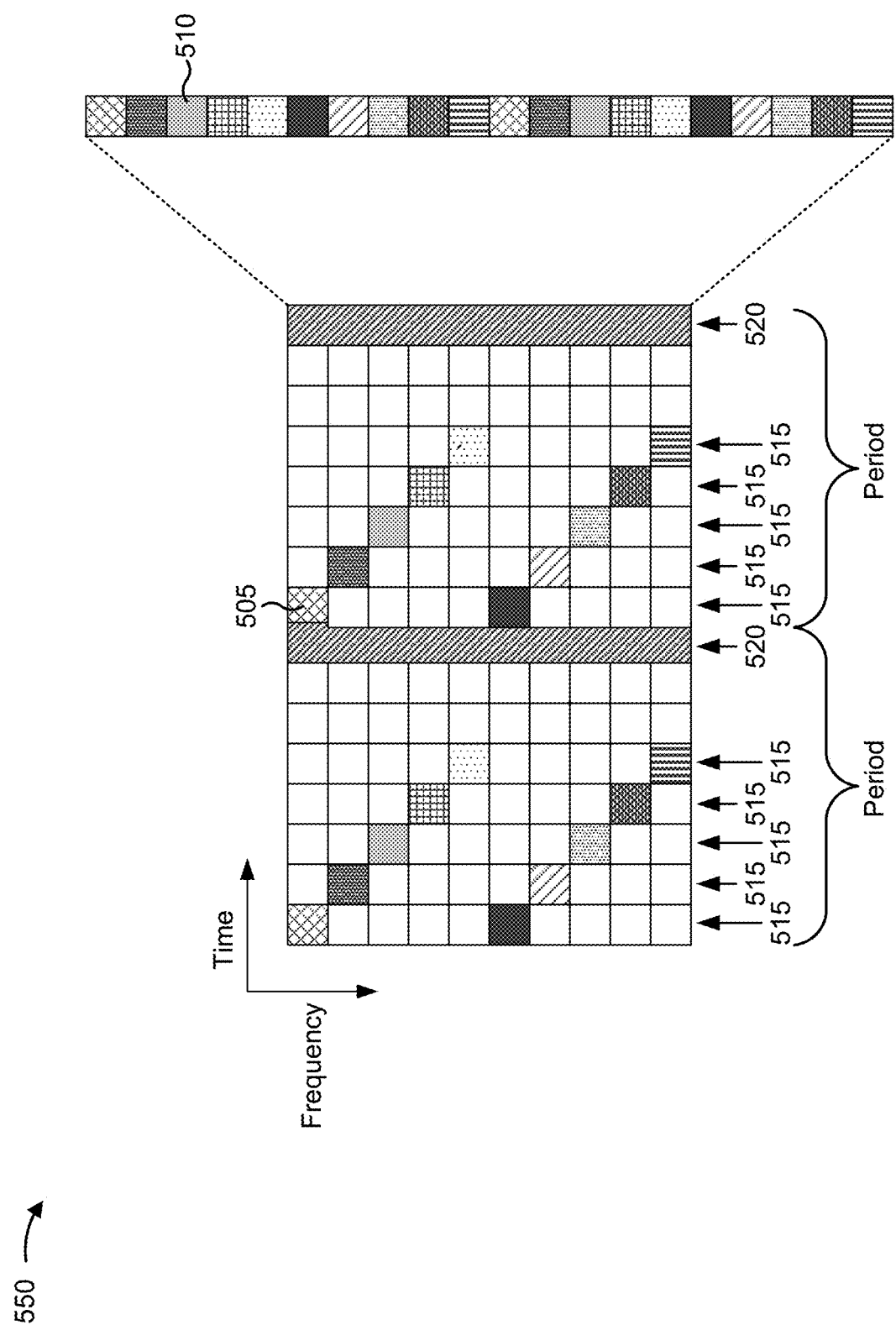

FIGS. 5A and 5B are diagrams illustrating examples 500 and 550 of requesting and reporting resources for sidelink inter-UE coordination information, in accordance with various aspects of the present disclosure.

A UE engaged in device-to-device communication, such as sidelink communication, may be configured with resources 505 that are to be used to transmit and/or receive requests for sidelink inter-UE coordination information (which may be referred to as requesting resources), and/or resources 510 that are to be used to transmit and/or receive reports of sidelink inter-UE coordination information (which may be referred to as reporting resources). A requesting resource 505 or a reporting resource 510 may include one or more sub-channels (e.g., of a sidelink resource pool) in a frequency domain and one slot in a time domain, however other configurations are possible. In some aspects, a reporting resource 510 and a requesting resource 505 may differ in size in a frequency domain and/or in a time domain.

The requesting resources 505 and the reporting resources 510 may be configured with a particular periodicity (e.g., the requesting resources 505 and the reporting resources 510 may be configured with the same periodicity or different periodicities). Each periodic occasion of the requesting resources 505 may be referred to as a requesting occasion 515, and each periodic occasion of the reporting resources 510 may be referred to as a reporting occasion 520. The reporting occasions 520 on the right side of FIGS. 5A and 5B are shown enlarged to illustrate the reporting resources 510.

In some aspects, if inter-UE coordination information is requested in a particular requesting occasion 515, then responsive inter-UE coordination information may be reported in the next reporting occasion 520 following the particular requesting occasion 515. That is, a requesting occasion 515 may be associated with a reporting occasion 520 that is to be used for responding to a request for inter-UE coordination information that was transmitted in the requesting occasion 515.

In some aspects, a requesting resource 505 may be mapped to one or more reporting resources 510. For example, in the examples 500 and 550, a requesting resource 505 shown with a particular fill may be mapped to one or more reporting resources 510 shown in the same fill. A UE may be configured with a mapping between requesting resources 505 and reporting resources 510, such as in a sidelink resource pool configuration. The mapping may indicate particular reporting resource(s) 510 that are to be used for responding to a request for inter-UE coordination information that was transmitted in a particular requesting resource 505 (e.g., according to a mapping between the particular requesting resource 505 and the particular reporting resource(s) 510).

In the example 500, the requesting resources 505 may be in a single requesting occasion 515 per period. That is, the requesting resources 505 may be in a single sidelink slot per period. In one or more examples, the single requesting occasion 515 may be associated with a single reporting occasion 520 per period.

In the example 550, the requesting resources 505 may be distributed over multiple requesting occasions 515 per period. That is, the requesting resources 505 may be in multiple slots per period. In one or more examples, the multiple requesting occasions 515 may be associated with a single reporting occasion 520 per period.

As indicated above, FIGS. 5A and 5B are provided as examples. Other examples may differ from what is described with respect to FIGS. 5A and 5B.

Figure 6:
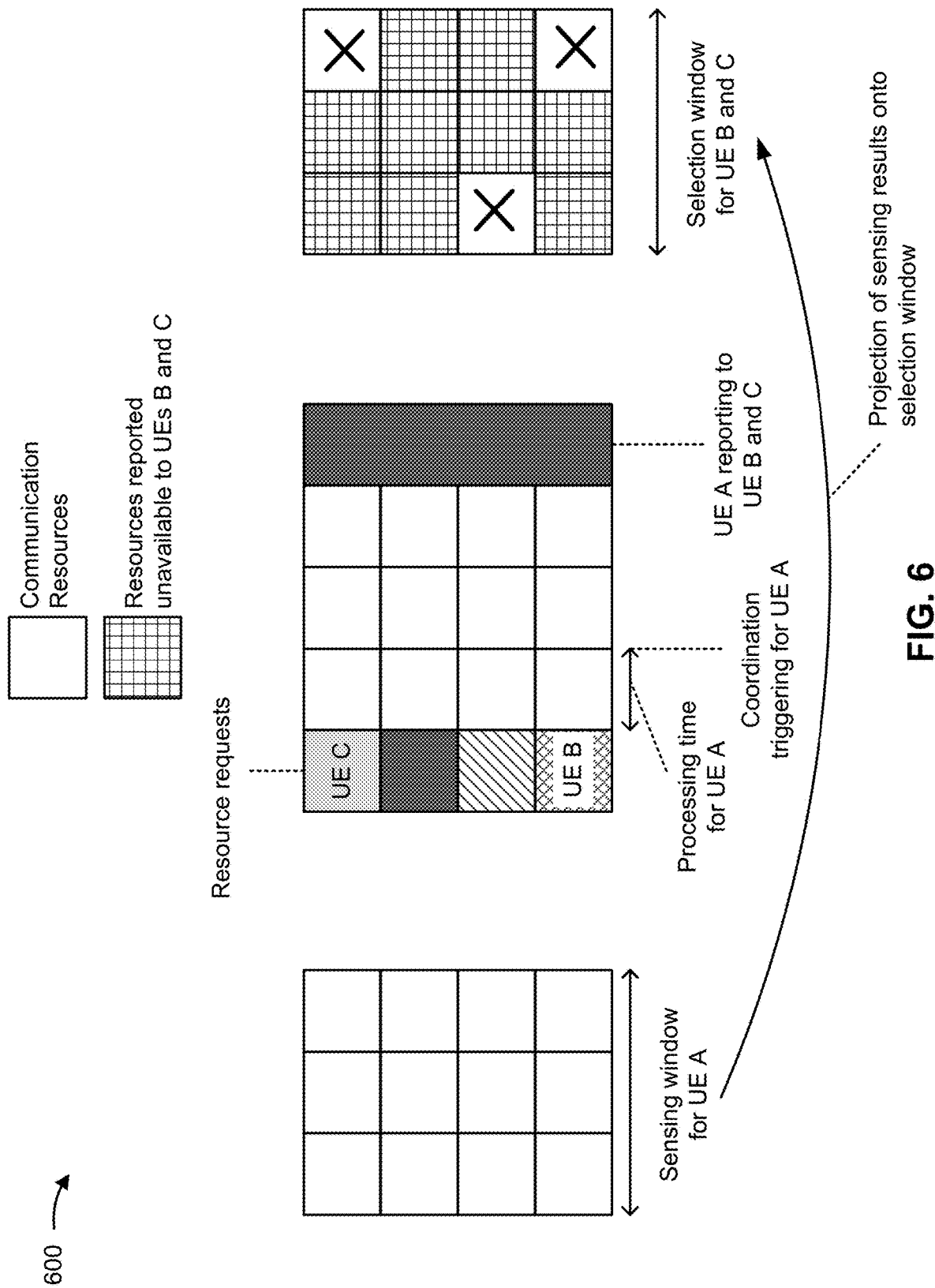
FIG. 6 is a diagram illustrating an example of resource sensing for sidelink inter-UE coordination, in accordance with the present disclosure.

FIG. 6 is a diagram illustrating an example 600 of resource sensing for sidelink inter-UE coordination, in accordance with various aspects of the present disclosure.

As shown in FIG. 6, during a sensing window, a UE A (which may correspond to, for example, UE 120*a*) may coordinate with other UEs, such as a UE B (which may correspond to, for example, UE 120*e*) and a UE C (which may correspond to, for example, UE 120*f*). For example, UEs B and C may request assistance from UE A in determining whether resources are available for communication. In another example, UE A may receive a request from a BS or a relay BS to assist with inter-UE coordination. In yet another example, UE A may autonomously determine to transmit an inter-UE coordination message, such as based at least in part on observed network conditions.

UE A may, during a sensing window, monitor for resource availability. The UE A may detect a request for resources from, for example, UE B, UE C, and other UEs. In some cases, UE A may experience a processing delay between when UE A detects a request for resources and when UE A has processed the request and is triggered to transmit an inter-UE coordination message to identify whether resources are available.

As further shown in FIG. 6, UE A may transmit reporting regarding whether resources are available to UE B, UE C, and/or other UEs. The transmission of the reporting may occur a threshold processing time before a selection window during which UE A, UE B, UE C, and other UEs may use resources that UE A has identified as available of unavailable. For example, as shown, UE A identifies one or more resources as available to UE B and UE C and other resources as unavailable to UE B and U C.

As indicated above, FIG. 6 is provided as an example. Other examples may differ from what is described with respect to FIG. 6.

Figure 7:
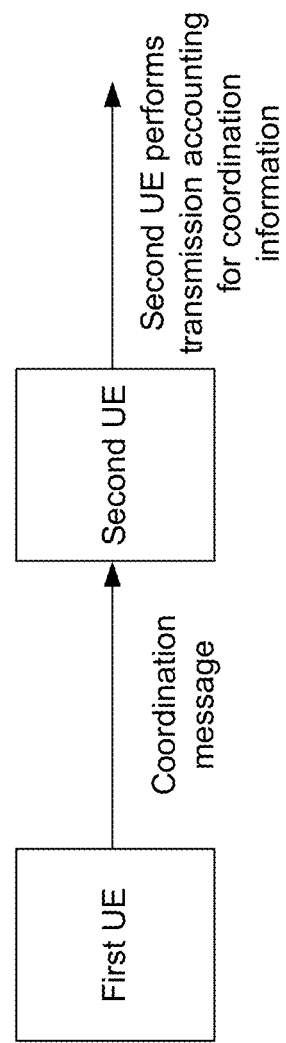
FIG. 7 is a diagram illustrating an example associated with coordination signaling, in accordance with the present disclosure.

FIG. 7 is a diagram illustrating an example 700 of coordination signaling, in accordance with various aspects of the present disclosure.

In example 700, a first UE (e.g., UE 120*a*) exchanges inter-UE coordination signaling with a second UE (e.g., UE 120*e*). The first UE and the second UE may operate in an in-coverage mode, a partial coverage mode, an out-of-coverage mode, a combination thereof, and/or the like. For example, the first UE may determine a set of sidelink resources available for a resource allocation. The first UE may determine the set of sidelink resources based at least in part on determining that the set of sidelink resources are to be selected, or based at least in part on a request, referred to herein as an inter-UE coordination request, received from the second UE or a base station. In some aspects, the first UE may determine the set of sidelink resources based at least in part on a sensing operation, which may be performed before receiving an inter-UE coordination request or after receiving the inter-UE coordination request. The first UE may transmit the set of available resources to the second UE via inter-UE coordination signaling (shown as a coordination message, and which may be referred to as an inter-UE coordination message). The first UE may transmit the set of available resources using an NR sidelink resource allocation mode 2. In the NR sidelink resource allocation mode 2, resource allocation is handled by UEs (e.g., in comparison to an NR sidelink resource allocation mode 1, in which resource allocation is handled by a scheduling entity such as a base station). The second UE may select a sidelink resource for a transmission from the second UE based at least in part on the set of available resources received from the first UE. As shown, the second UE may perform the transmission accounting for the coordination information (e.g., via a sidelink resource indicated by the inter-UE coordination message, a combination thereof, and/or the like). Inter-UE coordination signaling related to resource allocation may reduce collisions between the first UE and the second UE. Inter-UE coordination signaling related to resource allocation may reduce a power consumption for the first UE and/or the second UE.

As indicated above, FIG. 7 is provided as an example. Other examples may differ from what is described with respect to FIG. 7.

As described above, a first UE may receive a request to transmit a device-to-device coordination message from a second UE, a third UE, a BS, a combination thereof, and/or the like. The first UE may perform, in a sensing window, sensing to determine whether resources are available, in a selection window, to the second UE, the third UE, one or more other UEs associated with the BS, a combination thereof, and/or the like. After performing the sensing, the first UE may generate a set of device-to-device coordination messages to transmit to the second UE, the third UE, the BS, a combination thereof, and/or the like. However, the first UE may have a single transmission resource on which a plurality of device-to-device coordination messages are to be transmitted. Additionally, or alternatively, the first UE may have a plurality of concurrent resources on which to transmit a plurality of device-to-device coordination messages. However, a quantity of device-to-device coordination messages that the first UE is to transmit may be greater than concurrent transmission capability of the first UE.

Some aspects described herein provide techniques for message handling for device-to-device coordination messages. For example, the first UE may prioritize the set of device-to-device coordination messages according to a triggering event for a device-to-device coordination message, a source of a request for a device-to-device coordination message, or a type of transmission of a device-to-device coordination message among other factors described in more detail herein. Based at least in part on prioritizing the set of device-to-device coordination messages, the first UE may drop a first one or more device-to-device coordination messages and transmit a second one or more device-to-device coordination messages. In this way, the first UE can handle excess requests for device-to-device coordination messages.

Figure 8:
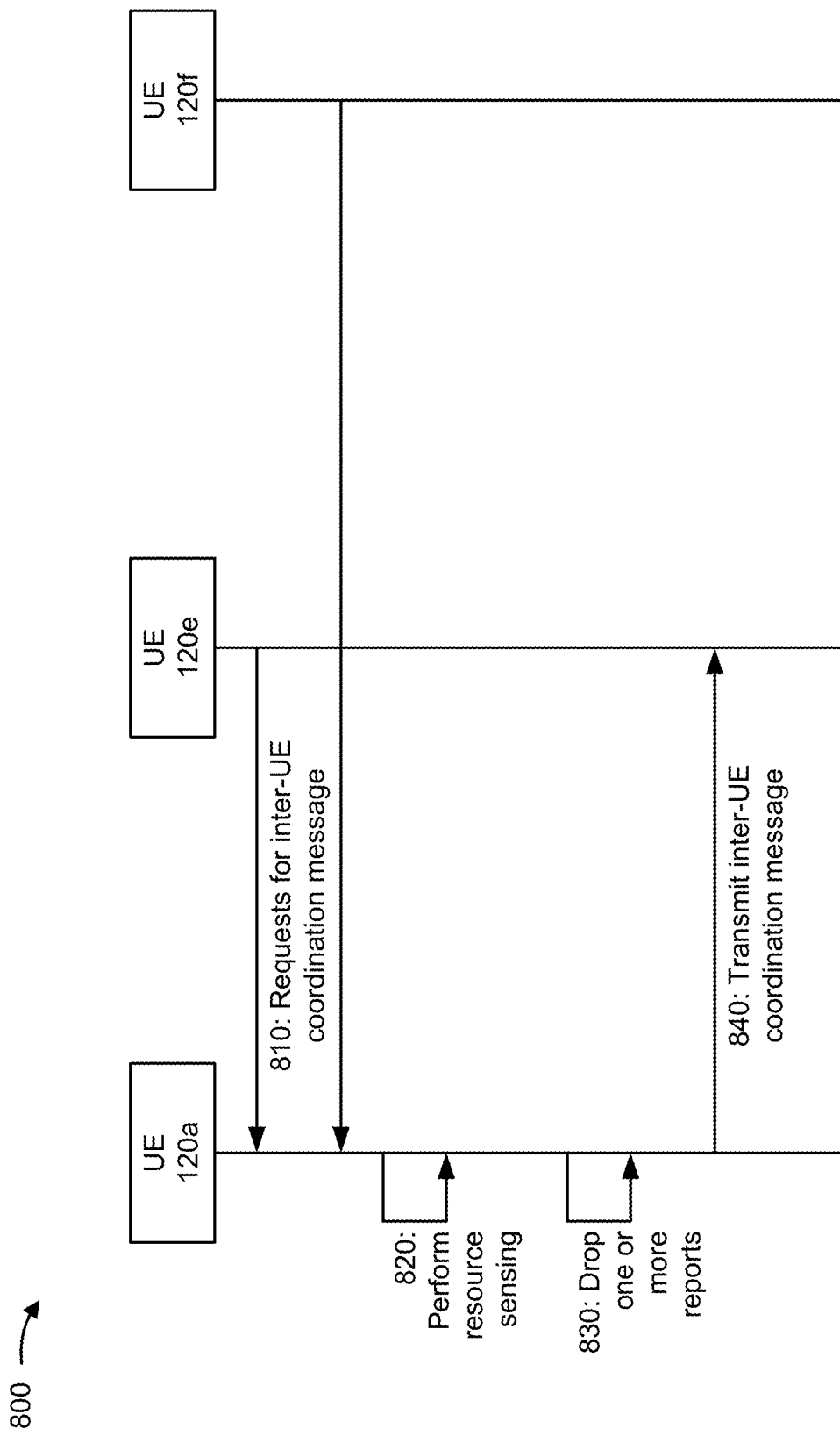
FIG. 8 is a diagram illustrating an example associated with message handling for device-to-device coordination messages, in accordance with the present disclosure.

FIG. 8 is a diagram illustrating an example 800 associated with message handling for device-to-device coordination messages, in accordance with various aspects of the present disclosure. As shown in FIG. 8, example 800 includes communication between a group of UEs 120, such as a UE 120*a*, a UE 120*e*, and a UE 120*f*. In some aspects, the UEs 120 may be included in a wireless network, such as wireless network 100. The UEs 120 may communicate on device-to-device links, which may include a sidelink.

As further shown in FIG. 8, and by reference number 810, UE 120*a* may receive a request for a device-to-device coordination message. For example, UE 120*a* may receive a first request for a sidelink inter-UE coordination message from UE 120*e* and a second request for a sidelink inter-UE coordination message from UE 120*f*. Additionally, or alternatively, UE 120*a* may receive requests for a report regarding resource availability from one or more other devices, such as additional requests for sidelink inter-UE coordination messages from additional UEs, a request for a resource availability report from a BS, a combination thereof, and/or the like.

As further shown in FIG. 8, and by reference number 820, UE 120*a* may perform resource sensing. For example, as described above, UE 120*a* may monitor resource utilization during a sensing window to predict a resource utilization during a selection window. In some aspects, UE 120*a* may detect a resource reservation during monitoring of the sensing window. For example, UE 120*a* may detect, during monitoring of the sensing window, an SCI from UE 120*e* indicating an attempt to reserve resources in the selection window. Additionally, or alternatively, UE 120*a* may detect an SCI from UE 120*f*, SCIs from both UE 120*e* and 120*f*, an SCI from another UE, a combination thereof, and/or the like.

As further shown in FIG. 8, and by reference number 830, UE 120*a* may drop one or more reports. For example, UE 120*a* may drop one or more inter-UE coordination messages that were scheduled for transmission. In some aspects, UE 120*a* may drop the one or more inter-UE coordination messages based at least in part on determining that a quantity (e.g., a total quantity) of inter-UE coordination messages satisfies a threshold. For example, UE 120*a* may determine that more than one inter-UE coordination message is scheduled for transmission using a single resource and may determine to drop one or more inter-UE coordination messages that are scheduled for transmission using the single resource. Additionally, or alternatively, UE 120*a* may determine that UE 120*a* has a capability of transmitting a particular quantity of concurrent inter-UE coordination messages and may determine that an actual quantity of inter-UE coordination messages scheduled for concurrent transmission exceeds the particular quantity.

In some aspects, UE 120*a* may drop one or more inter-UE coordination messages based at least in part on a prioritization rule. For example, UE 120*a* may receive information (e.g., from a BS) identifying a prioritization rule for UE 120a, for a resource pool that includes UE 120a, for a carrier on which UE 120a is operating, for a bandwidth part on which UE 120a is operating, a combination thereof, and/or the like, and may implement the prioritization rule to select which inter-UE coordination messages to transmit or drop.

In some aspects, UE 120a may prioritize inter-UE coordination messages based at least in part on a requesting device type. For example, UE 120a may determine to prioritize report requests from a BS (e.g., directly from the BS or relayed by another UE from the BS) above report requests from UEs 120e and 120f. Additionally, or alternatively, UE 120a may prioritize report requests from a particular UE that is serving as a sidelink transmission UE for UE 120a. For example, when UE 120a communicates with a BS via a relay connection provided by UE 120e, UE 120a may prioritize a request for an inter-UE coordination message from UE 120e over requests from other UEs, such as UE 120f.

In some aspects, UE 120a may prioritize inter-UE coordination messages for transmission or dropping based at least in part on another factor. For example, UE 120a may prioritize inter-UE coordination messages based at least in part on respective priority levels of requests for the inter-UE coordination messages. Additionally, or alternatively, UE 120a may prioritize inter-UE coordination messages based at least in part on a source identifier of a requesting UE, a zone identifier of a requesting UE, a zone identifier of a receive UE associated with the requesting UE (e.g., a UE for which the requesting UE is a transmitting UE providing sidelink relay), a combination thereof, and/or the like. Further to the aforementioned example, when UE 120a is closer (e.g., based at least in part on zone identifier) to UE 120e than to UE 120f, UE 120a may prioritize transmitting an inter-UE coordination message to UE 120e over transmitting an inter-UE coordination message to UE 120f.

Additionally, or alternatively, UE 120a may prioritize inter-UE coordination messages based at least in part on respective transmission types. For example, UE 120a may prioritize a broadcast or groupcast inter-UE coordination message directed to a plurality of UEs over a unicast inter-UE coordination message directed to a single UE. Additionally, or alternatively, UE 120a may prioritize transmitting inter-UE coordination messages triggered by requests with lower RSRP values than other requests. In other words, when UE 120e transmits a request with a first RSRP value and UE 120f transmits a request with a second RSRP value that is higher than the first RSRP value, UE 120a may prioritize transmitting the inter-UE coordination message to UE 120e.

Additionally, or alternatively, UE 120a may prioritize inter-UE coordination messages based at least in part on an ordering of requests. For example, when UE 120e requests the inter-UE coordination message before UE 120f, UE 120a may prioritize transmitting the inter-UE coordination message to UE 120e over UE 120f. In some aspects, UE 120a may use a tiebreaking rule for prioritizing inter-UE coordination messages. For example, UE 120a may select, for dropping or for transmission, equally prioritized inter-UE coordination messages based at least in part on a random selection rule, a sequential rule, a combination thereof, and/or the like.

Although some aspects are described herein in terms of a particular prioritization rule or factor, UE 120a may use a combination of one or more factors, which may be defined for UE 120a in a specification or defined on an implementation basis for UE 120a.

As further shown in FIG. 8, and by reference number 840, UE 120a may transmit one or more device-to-device coordination messages (that were not dropped in connection with prioritizing a set of device-to-device coordination messages). For example, UE 120a may transmit a first inter-UE coordination message identifying a resource availability in the selection window to UE 120e (and may forgo transmitting a second inter-UE coordination message to UE 120f, having dropped the second inter-UE coordination message in accordance with a prioritization rule). In some aspects, UE 120e may interpret the inter-UE coordination message to determine whether a resource is available or unavailable, thereby enabling UE 120e to transmit in the selection window.

As indicated above, FIG. 8 is provided as an example. Other examples may differ from what is described with respect to FIG. 8.

Figure 9:
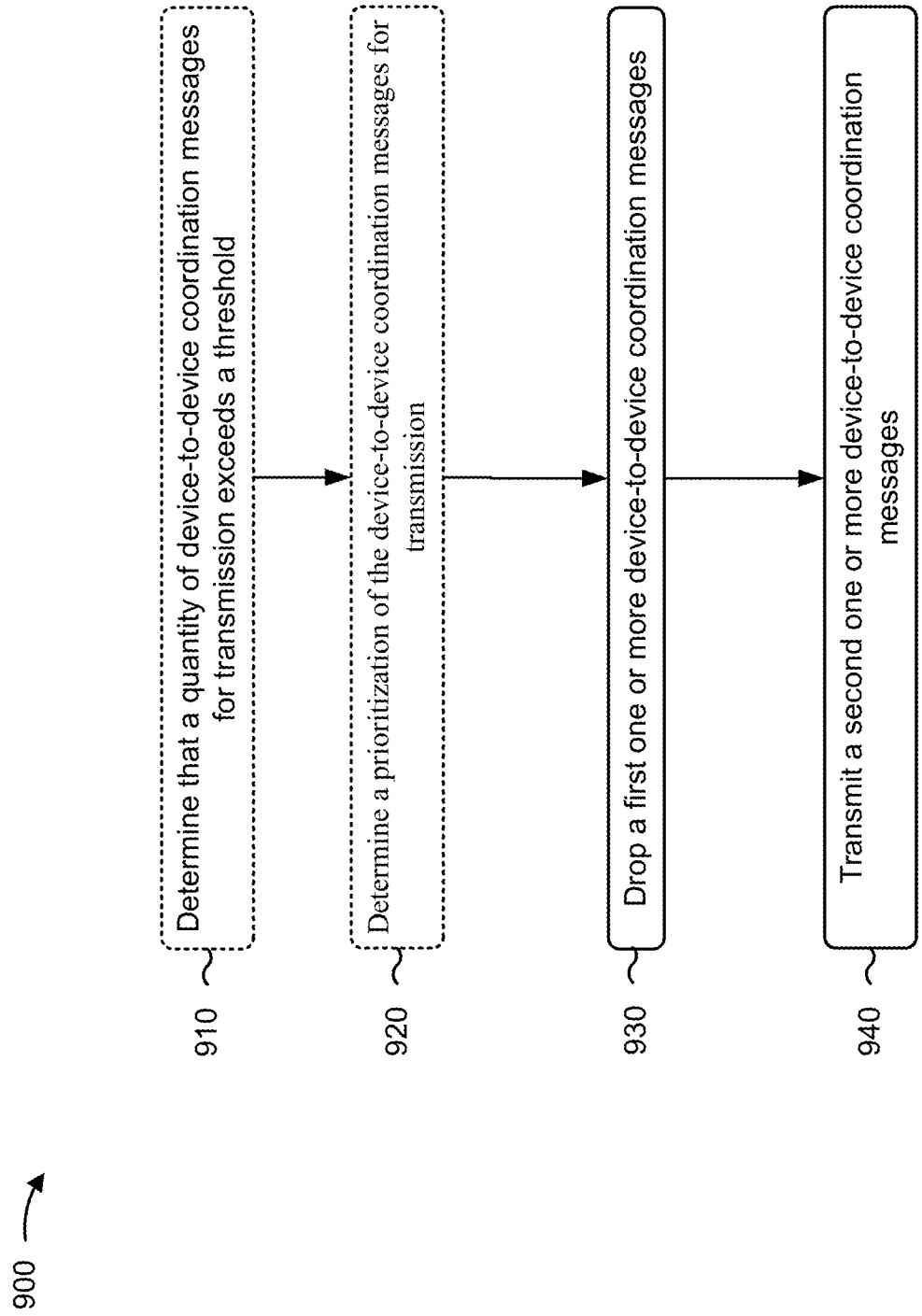
FIG. 9 is a diagram illustrating an example process associated with message handling for device-to-device coordination messages, in accordance with the present disclosure.

FIG. 9 is a diagram illustrating an example process 900 performed, for example, by a UE, in accordance with various aspects of the present disclosure. Example process 900 is an example where the UE (e.g., UE 120) performs operations associated with message handling for device-to-device coordination messages.

As shown in FIG. 9, in some aspects, process 900 may include determining that a quantity of device-to-device coordination messages for transmission exceeds a threshold (block 910). For example, the UE (e.g., using determination component 1010 depicted in FIG. 10) may determine that a quantity (e.g., a total quantity) of device-to-device coordination messages for transmission exceeds a threshold, as described above.

As shown in FIG. 9, in some aspects, process 900 may include determining a prioritization of the device-to-device coordination messages for transmission (block 920). For example, the UE (e.g., using determination component 1010) may determine a prioritization of the device-to-device coordination messages for transmission, as described above.

As further shown in FIG. 9, in some aspects, process 900 may include dropping a first one or more device-to-device coordination messages (block 930). For example, the UE (e.g., using dropping component 1012 depicted in FIG. 10) may drop a first one or more device-to-device coordination messages according to a message dropping criterion based at least in part on determining that the quantity of device-to-device coordination messages exceeds the threshold, as described above.

As shown in FIG. 9, in some aspects, process 900 may include transmitting a second one or more device-to-device coordination messages (block 940). For example, the UE (e.g., using transmission component 1006 depicted in FIG. 10) may transmit a second one or more device-to-device coordination messages based at least in part on dropping the one or more device-to-device coordination messages, as described above.

Process 900 may include additional aspects, such as any single aspect or any combination of aspects described below and/or in connection with one or more other processes described elsewhere herein.

In a first aspect, process 900 includes transmitting, using transmission component 1006, the second one or more device-to-device coordination messages based at least in part on dropping the first one or more device-to-device coordination messages, wherein the second one or more device-to-device coordination messages does not exceed the threshold.

In a second aspect, alone or in combination with the first aspect, dropping the first one or more device-to-device coordination messages comprises determining a prioritization of the set of device-to-device coordination messages, and dropping the first one or more device-to-device coordination messages based at least in part on the prioritization of the device-to-device coordination messages.

In a third aspect, alone or in combination with one or more of the first and second aspects, the prioritization, for a device-to-device coordination message of the set of device-to-device coordination messages, is based at least in part on a characteristic of a device that triggers the device-to-device coordination message.

In a fourth aspect, alone or in combination with one or more of the first through third aspects, the prioritization, for a device-to-device coordination message of the set of device-to-device coordination messages, is based at least in part on at least one of a priority level of the device-to-device coordination message, a source identifier of a UE that requested the device-to-device coordination message, a zone identifier of the UE that requested the device-to-device coordination message, a zone identifier of another UE associated with the UE that requested the device-to-device coordination message, a type of data that is to be transmitted based at least in part on a result of the device-to-device coordination message, a reference signal received power of a request for the device-to-device coordination message, a timing of the device-to-device coordination message, or a combination thereof.

In a fifth aspect, alone or in combination with one or more of the first through fourth aspects, process 900 includes receiving, using reception component 1002, signaling identifying a configuration of the message dropping criterion, wherein the configuration is on at least one of a per UE basis, a per resource pool basis, a per carrier basis, a per bandwidth part basis, or a combination thereof.

In a sixth aspect, alone or in combination with one or more of the first through fifth aspects, the message dropping criterion is a UE configuration.

In a seventh aspect, alone or in combination with one or more of the first through sixth aspects, the message dropping criterion includes a random message dropping procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
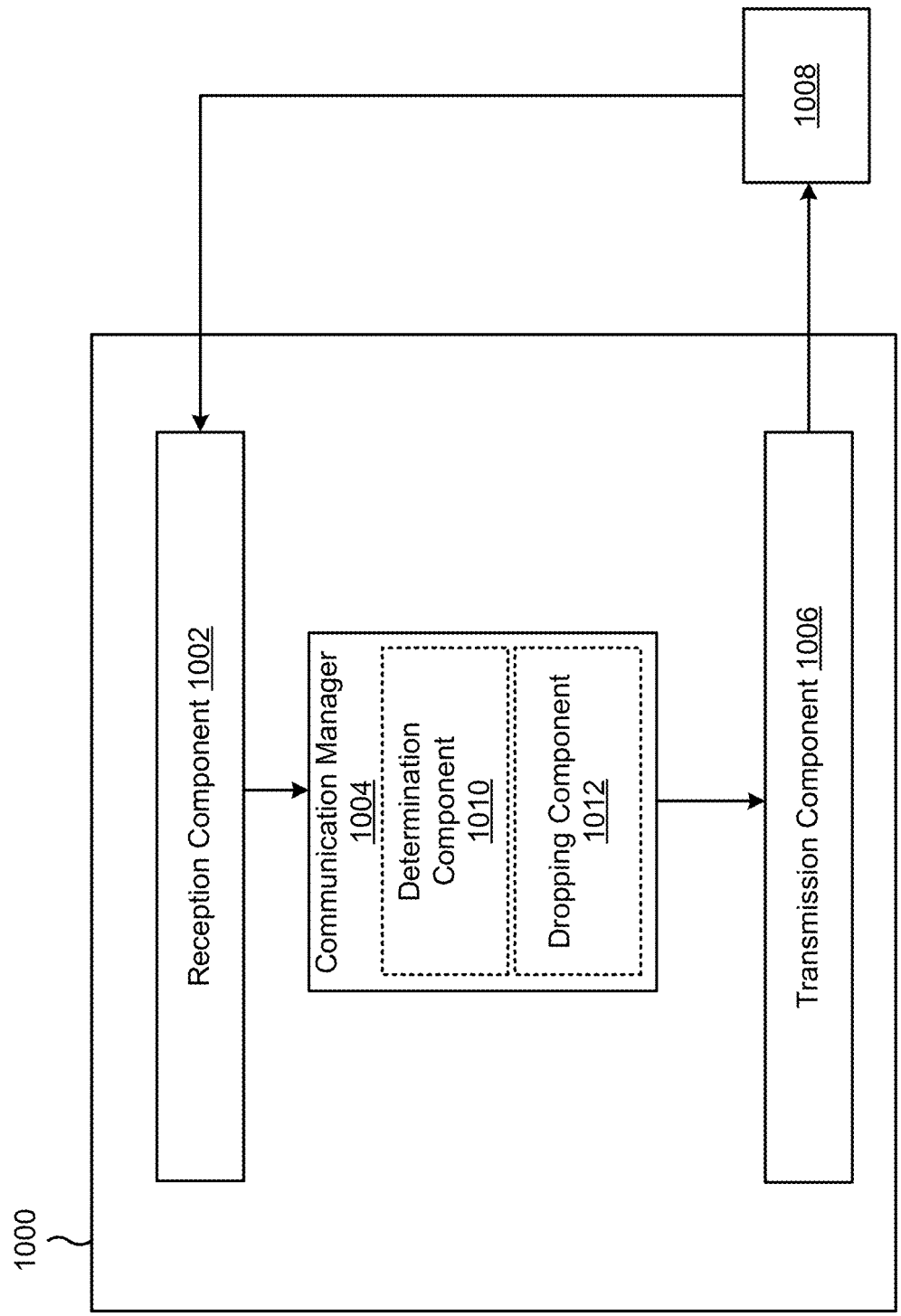
FIG. 10 is a diagram of an example apparatus for wireless communication, in accordance with the present disclosure.

FIG. 10 is a block diagram of an example apparatus 1000 for wireless communication in accordance with various aspects of the present disclosure. The apparatus 1000 may be a UE, or a UE may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIG. 8. Additionally, or alternatively, the apparatus 1000 may be configured to perform one or more processes described herein, such as process 900 of FIG. 9 or a combination thereof. In some aspects, the apparatus 1000 may include one or more components of the UE described above in connection with FIG. 2.

The reception component 1002 may receive communications, such as reference signals, control information, data communications, or a combination thereof, from the apparatus 1008. The reception component 1002 may receive signaling identifying a configuration of the message dropping criterion. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the UE described above in connection with FIG. 2.

The transmission component 1006 may transmit communications, such as reference signals, control information, data communications, or a combination thereof, to the apparatus 1008. The transmission component 1006 may transmit a set of device-to-device coordination messages based at least in part on dropping the one or more device-to-device coordination messages. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the UE described above in connection with FIG. 2. In some aspects, the transmission component 1006 may be co-located with the reception component 1002 in a transceiver.

The communication manager 1004 may determine that a quantity of device-to-device coordination messages for transmission exceeds a threshold. The communication manager 1004 may drop one or more device-to-device coordination messages according to a message dropping criterion based at least in part on determining that the quantity of device-to-device coordination messages exceeds the threshold. In some aspects, the communication manager 1004 may include a controller/processor, a memory, a scheduler, a communication unit, or a combination thereof, of the UE described above in connection with FIG. 2.

In some aspects, the communication manager 1004 may include a set of components, such as a determination component 1010, a dropping component 1012, or a combination thereof. Alternatively, the set of components may be separate and distinct from the communication manager 1004. In some aspects, one or more components of the set of components may include or may be implemented within a controller/processor, a memory, a scheduler, a communication unit, or a combination thereof, of the UE described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The determination component 1010 may determine that a quantity of device-to-device coordination messages for transmission exceeds a threshold, determine a prioritization of the device-to-device coordination messages for transmission, a combination thereof, and/or the like. The dropping component 1012 may drop one or more device-to-device coordination messages according to a message dropping criterion based at least in part on the determination component 1010 determining that the quantity of device-to-device coordination messages exceeds the threshold. The transmission component 1006 may transmit one or more device-to-device coordination messages, such that a quantity of the transmitted one or more device-to-device coordination messages does not exceed the threshold.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
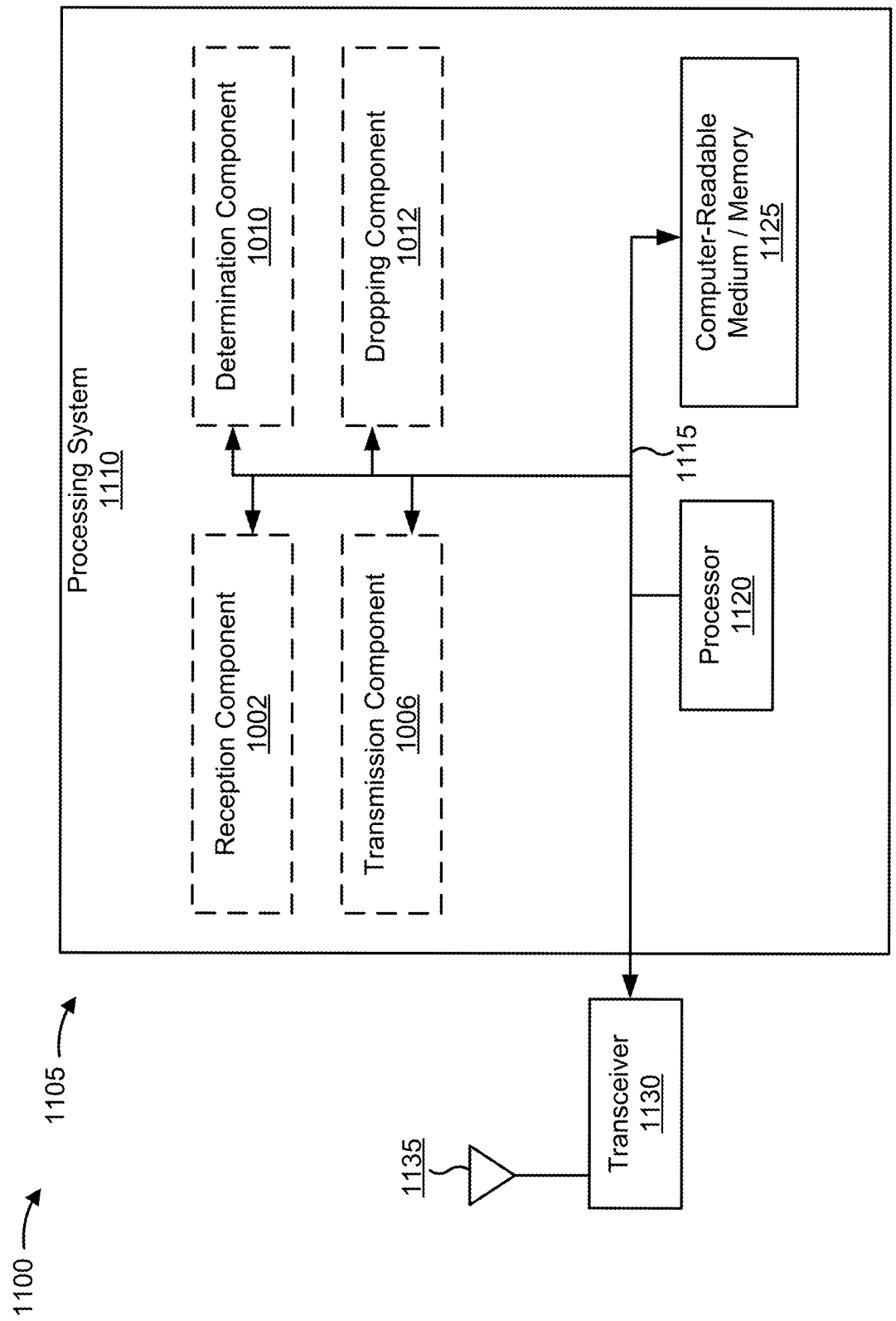
FIG. 11 is a diagram illustrating an example of a hardware implementation for an apparatus employing a processing system, in accordance with the present disclosure.

FIG. 11 is a diagram illustrating an example 1100 of a hardware implementation for an apparatus 1105 employing a processing system 1110. The apparatus 1105 may be a UE.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, power management circuits, and/or the like.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1006, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer-readable medium/memory 1125, one or more hardware modules coupled to the processor 1120, or some combination thereof.

In some aspects, the processing system 1110 may be a component of the UE 120 and may include the memory 282 and/or at least one of the TX MIMO processor 266, the RX processor 258, and/or the controller/processor 280. In some aspects, the apparatus 1105 for wireless communication includes means for determining that a quantity of device-to-device coordination messages for transmission exceeds a threshold, means for dropping one or more device-to-device coordination messages according to a message dropping criterion based at least in part on determining that the quantity of device-to-device coordination messages exceeds the threshold, a combination thereof, and/or the like. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

Figure 12:
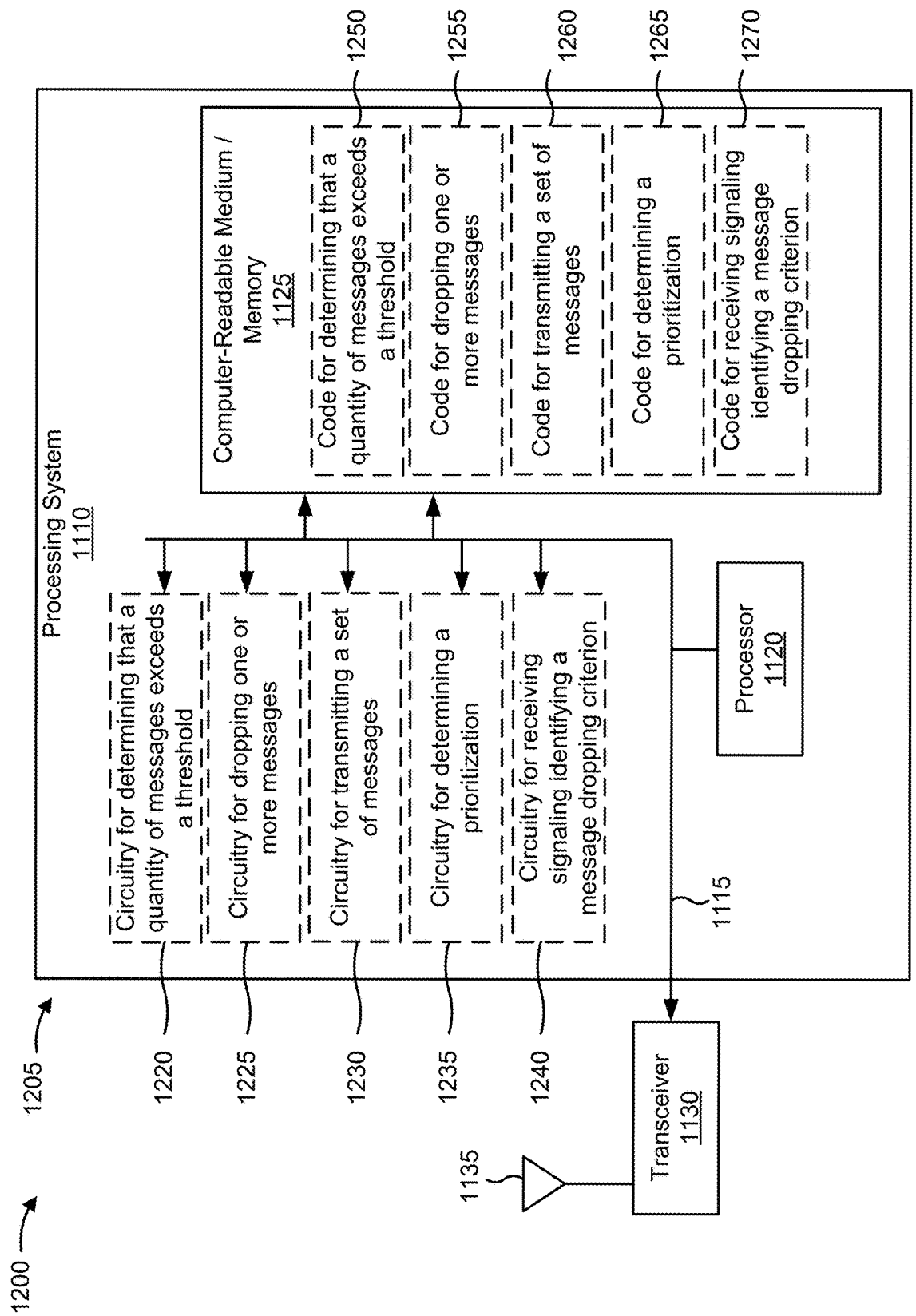
FIG. 12 is a diagram illustrating an example implementation of code and circuitry for an apparatus, in accordance with the present disclosure.

FIG. 12 is a diagram illustrating an example 1200 of an implementation of code and circuitry for an apparatus 1205. The apparatus 1205 may be a UE.

As further shown in FIG. 12, the apparatus may include circuitry for determining that a quantity of messages exceeds a threshold (circuitry 1220). For example, the apparatus may include circuitry to enable the apparatus to determine that a quantity of device-to-device coordination messages for transmission exceeds a threshold.

As further shown in FIG. 12, the apparatus may include circuitry for dropping one or more messages (circuitry 1225). For example, the apparatus may include circuitry to enable the apparatus to drop one or more device-to-device coordination messages according to a message dropping criterion based at least in part on determining that the quantity of device-to-device coordination messages exceeds the threshold.

As further shown in FIG. 12, the apparatus may include circuitry for transmitting a set of messages (circuitry 1230). For example, the apparatus may include circuitry to transmit a set of device-to-device coordination messages based at least in part on dropping the one or more device-to-device coordination messages.

As further shown in FIG. 12, the apparatus may include circuitry for determining a prioritization (circuitry 1235). For example, the apparatus may include circuitry to enable the apparatus to determine a prioritization of the device-to-device coordination messages for transmission.

As further shown in FIG. 12, the apparatus may include circuitry for receiving signaling identifying a message dropping criterion (circuitry 1240). For example, the apparatus may include circuitry to enable the apparatus to receive signaling identifying a configuration of the message dropping criterion, wherein the configuration is on at least one of a per UE basis, a per resource pool basis, a per carrier basis, a per bandwidth part basis, a combination thereof, and/or the like.

As further shown in FIG. 12, the apparatus may include, stored in computer-readable medium 1125, code for determining that a quantity of messages exceeds a threshold (code 1250). For example, the apparatus may include code that, when executed by the processor 1120, may cause the processor 1120 determine that a quantity of device-to-device coordination messages for transmission exceeds a threshold.

As further shown in FIG. 12, the apparatus may include, stored in computer-readable medium 1125, code for dropping one or more messages (code 1255). For example, the apparatus may include code that, when executed by the processor 1120, may cause the transceiver 1130 to drop one or more device-to-device coordination messages according to a message dropping criterion based at least in part on determining that the quantity of device-to-device coordination messages exceeds the threshold.

As further shown in FIG. 12, the apparatus may include, stored in computer-readable medium 1125, code for transmitting a set of messages (code 1260). For example, the apparatus may include code that, when executed by the processor 1120, may cause the transceiver 1130 to transmit a set of device-to-device coordination messages based at least in part on dropping the one or more device-to-device coordination messages.

As further shown in FIG. 12, the apparatus may include, stored in computer-readable medium 1125, code for determining a prioritization (code 1265). For example, the apparatus may include code that, when executed by the processor 1120, may cause the processor 1120 to determine a prioritization of the device-to-device coordination messages for transmission.

As further shown in FIG. 12, the apparatus may include, stored in computer-readable medium 1125, code for receiving signaling identifying a message dropping criterion (code 1270). For example, the apparatus may include code that, when executed by the processor 1120, may cause the transceiver 1130 to receive signaling identifying a configuration of the message dropping criterion.

FIG. 12 is provided as an example. Other examples may differ from what is described in connection with FIG. 12.

The following provides an overview of some Aspects of the present disclosure:

Aspect 1: A method of wireless communication performed by a user equipment (UE), comprising: dropping a first one or more device-to-device coordination messages for transmission, of a set of device-to-device coordination messages, according to a message dropping criterion in connection with a quantity of device-to-device coordination messages in the set of device-to-device coordination messages exceeding a threshold; and transmitting a second one or more device-to-device coordination messages of the set of device-to-device coordination messages, such that a quantity of transmitted device-to-device coordination messages, of the set of device-to-device coordination messages, does not exceed the threshold.

Aspect 2: The method of Aspect 1, further comprising: determining that a quantity of device-to-device coordination messages for transmission exceeds a threshold; and dropping the first one or more device-to-device coordination messages based on determining that the quantity of device-to-device coordination messages exceeds the threshold.

Aspect 3: The method of any of Aspects 1 to 2, wherein dropping the one or more device-to-device coordination messages comprises: determining a prioritization of the set of device-to-device coordination messages; and dropping the first one or more device-to-device coordination messages based at least in part on the prioritization of the set of device-to-device coordination messages.

Aspect 4: The method of Aspect 3, wherein the prioritization, for a device-to-device coordination message of the set of device-to-device coordination messages, is based at least in part on a characteristic of a device that triggers the device-to-device coordination message.

Aspect 5: The method of any of Aspects 3 to 4, wherein the prioritization, for a device-to-device coordination message of the set of device-to-device coordination messages, is based at least in part on at least one of: a priority level of the device-to-device coordination message, a source identifier of a UE that requested the device-to-device coordination message, a zone identifier of the UE that requested the device-to-device coordination message, a zone identifier of another UE associated with the UE that requested the device-to-device coordination message, a type of data that is to be transmitted based at least in part on a result of the device-to-device coordination message, a reference signal received power of a request for the device-to-device coordination message, a timing of the device-to-device coordination message, or a combination thereof.

Aspect 6: The method of any of Aspects 1 to 5, further comprising: receiving signaling identifying a configuration of the message dropping criterion, wherein the configuration is on at least one of a per UE basis, a per resource pool basis, a per carrier basis, a per bandwidth part basis, or a combination thereof.

Aspect 7: The method of any of Aspects 1 to 6, wherein the message dropping criterion is a UE configuration.

Aspect 8: The method of any of Aspects 1 to 7, wherein the message dropping criterion includes a random message dropping procedure.

Aspect 9: An apparatus for wireless communication at a device, comprising a processor; memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      drop a first one or more device-to-device coordination messages, of a set of device-to-device coordination messages for transmission, according to a message dropping criterion in connection with a quantity of device-to-device coordination messages in the set of device-to-device coordination messages exceeding a threshold; and
      transmit a second one or more device-to-device coordination messages of the set of device-to-device coordination messages, such that a quantity of transmitted device-to-device coordination messages, of the set of device-to-device coordination messages, does not exceed the threshold.

2. The UE of claim 1, wherein the threshold is based at least in part on a capability of a target for at least one of the second one or more device-to-device coordination messages.

3. The UE of claim 1, wherein the one or more processors, to drop the first one or more device-to-device coordination messages, are configured to:
   determine a prioritization of the set of device-to-device coordination messages; and
   drop the first one or more device-to-device coordination messages based at least in part on the prioritization of the set of device-to-device coordination messages.

4. The UE of claim 3, wherein the prioritization, for a device-to-device coordination message of the set of device-to-device coordination messages, is based at least in part on a characteristic of a device that triggers the device-to-device coordination message.

5. The UE of claim 3, wherein the prioritization, for a device-to-device coordination message of the set of device-to-device coordination messages, is based at least in part on at least one of:
   a priority level of the device-to-device coordination message,
   a source identifier of a UE that requested the device-to-device coordination message,
   a zone identifier of the UE that requested the device-to-device coordination message,
   a zone identifier of another UE associated with the UE that requested the device-to-device coordination message,
   a type of data that is to be transmitted based at least in part on a result of the device-to-device coordination message,
   a reference signal received power of a request for the device-to-device coordination message, or
   a timing of the device-to-device coordination message.

6. The UE of claim 1, wherein the one or more processors are further configured to:
   receive signaling identifying a configuration of the message dropping criterion, wherein the configuration is on at least one of a per UE basis, a per resource pool basis, a per carrier basis, or a per bandwidth part basis.

7. The UE of claim 1, wherein the message dropping criterion is a UE configuration.

8. The UE of claim 1, wherein the message dropping criterion includes a random message dropping procedure.

9. A non-transitory computer-readable medium storing a set of instructions for wireless communication, the set of instructions comprising:
   one or more instructions that, when executed by one or more processors of a user equipment (UE), cause the UE to:
      drop a first one or more device-to-device coordination messages, of a set of device-to-device coordination messages for transmission, according to a message dropping criterion in connection with a quantity of device-to-device coordination messages in the set of device-to-device coordination messages exceeding a threshold; and
transmit a second one or more device-to-device coordination messages of the set of device-to-device coordination messages, such that a quantity of transmitted device-to-device coordination messages, of the set of device-to-device coordination messages, does not exceed the threshold.

10. The non-transitory computer-readable medium of claim 9, wherein the threshold is based at least in part on a capability of a target for at least one of the second one or more device-to-device coordination messages.

11. The non-transitory computer-readable medium of claim 9, wherein the one or more instructions further cause the UE to:
determine a prioritization of the set of device-to-device coordination messages; and
drop the first one or more device-to-device coordination messages based at least in part on the prioritization of the set of device-to-device coordination messages.

12. The non-transitory computer-readable medium of claim 11, wherein the prioritization, for a device-to-device coordination message of the set of device-to-device coordination messages, is based at least in part on a characteristic of a device that triggers the device-to-device coordination message.

13. The non-transitory computer-readable medium of claim 11, wherein the prioritization, for a device-to-device coordination message of the set of device-to-device coordination messages, is based at least in part on at least one of:
a priority level of the device-to-device coordination message,
a source identifier of a UE that requested the device-to-device coordination message,
a zone identifier of the UE that requested the device-to-device coordination message,
a zone identifier of another UE associated with the UE that requested the device-to-device coordination message,
a type of data that is to be transmitted based at least in part on a result of the device-to-device coordination message,
a reference signal received power of a request for the device-to-device coordination message, or
a timing of the device-to-device coordination message.

14. The non-transitory computer-readable medium of claim 9, wherein the one or more instructions further cause the UE to:
receive signaling identifying a configuration of the message dropping criterion, wherein the configuration is on at least one of a per UE basis, a per resource pool basis, a per carrier basis, or a per bandwidth part basis.

15. The non-transitory computer-readable medium of claim 9, wherein the message dropping criterion is a UE configuration.

16. The non-transitory computer-readable medium of claim 9, wherein the message dropping criterion includes a random message dropping procedure.

17. An apparatus for wireless communication, comprising:
means for dropping a first one or more device-to-device coordination messages, of a set of device-to-device coordination messages for transmission, according to a message dropping criterion in connection with a quantity of device-to-device coordination messages in the set of device-to-device coordination messages exceeding a threshold; and
means for transmitting a second one or more device-to-device coordination messages of the set of device-to-device coordination messages, such that a quantity of transmitted device-to-device coordination messages, of the set of device-to-device coordination messages, does not exceed the threshold.

18. The apparatus of claim 17, wherein the threshold is based at least in part on a capability of a target for at least one of the second one or more device-to-device coordination messages.

19. The apparatus of claim 17, further comprising:
means for determining a prioritization of the set of device-to-device coordination messages; and
means for dropping the first one or more device-to-device coordination messages based at least in part on the prioritization of the set of device-to-device coordination messages.

20. The apparatus of claim 19, wherein the prioritization, for a device-to-device coordination message of the set of device-to-device coordination messages, is based at least in part on a characteristic of a device that triggers the device-to-device coordination message.

21. The apparatus of claim 19, wherein the prioritization, for a device-to-device coordination message of the set of device-to-device coordination messages, is based at least in part on at least one of:
a priority level of the device-to-device coordination message,
a source identifier of a UE that requested the device-to-device coordination message,
a zone identifier of the UE that requested the device-to-device coordination message,
a zone identifier of another UE associated with the UE that requested the device-to-device coordination message,
a type of data that is to be transmitted based at least in part on a result of the device-to-device coordination message,
a reference signal received power of a request for the device-to-device coordination message, or
a timing of the device-to-device coordination message.

22. The apparatus of claim 17, further comprising:
means for receiving signaling identifying a configuration of the message dropping criterion, wherein the configuration is on at least one of a per UE basis, a per resource pool basis, a per carrier basis, or a per bandwidth part basis.

23. The apparatus of claim 17, wherein the message dropping criterion is a UE configuration.

24. The apparatus of claim 17, wherein the message dropping criterion includes a random message dropping procedure.

25. A method of wireless communication performed by a user equipment (UE), comprising:
dropping a first one or more device-to-device coordination messages, of a set of device-to-device coordination messages for transmission, according to a message dropping criterion in connection with a quantity of device-to-device coordination messages in the set of device-to-device coordination messages exceeding a threshold; and
transmitting a second one or more device-to-device coordination messages of the set of device-to-device coordination messages, such that a quantity of transmitted device-to-device coordination messages, of the set of device-to-device coordination messages, does not exceed the threshold.

26. The method of claim 25, wherein the threshold is based at least in part on a capability of a target for at least one of the second one or more device-to-device coordination messages.

27. The method of claim 25, wherein dropping the first one or more device-to-device coordination messages comprises:
    determining a prioritization of the set of device-to-device coordination messages; and
    dropping the first one or more device-to-device coordination messages based at least in part on the prioritization of the set of device-to-device coordination messages.

28. The method of claim 27, wherein the prioritization, for a device-to-device coordination message of the set of device-to-device coordination messages, is based at least in part on a characteristic of a device that triggers the device-to-device coordination message.

29. The method of claim 27, wherein the prioritization, for a device-to-device coordination message of the set of device-to-device coordination messages, is based at least in part on at least one of:

a priority level of the device-to-device coordination message, a source identifier of a UE that requested the device-to-device coordination message, a zone identifier of the UE that requested the device-to-device coordination message, a zone identifier of another UE associated with the UE that requested the device-to-device coordination message, a type of data that is to be transmitted based at least in part on a result of the device-to-device coordination message, a reference signal received power of a request for the device-to-device coordination message, or a timing of the device-to-device coordination message.

30. The method of claim 25, further comprising:

receiving signaling identifying a configuration of the message dropping criterion, wherein the configuration is on at least one of a per UE basis, a per resource pool basis, a per carrier basis, or a per bandwidth part basis.

* * * * *